United States Patent
Li et al.

(10) Patent No.: US 9,201,832 B2
(45) Date of Patent: Dec. 1, 2015

(54) ELECTRONIC DEVICE WITH USB INTERFACE AND METHOD FOR STARTING USB COMMUNICATION THEREFOR

(75) Inventors: Qirui Li, Shenzhen (CN); Chao Li, Shenzhen (CN); Huiqin Shi, Shenzhen (CN); Min Xu, Shenzhen (CN); Tao Wang, Shenzhen (CN); Pengbin Xu, Shenzhen (CN)

(73) Assignee: ZTE CORPORATION (CN)

( * ) Notice: Subject to any disclaimer, the term of this patent is extended or adjusted under 35 U.S.C. 154(b) by 154 days.

(21) Appl. No.: 14/113,238

(22) PCT Filed: Nov. 21, 2011

(86) PCT No.: PCT/CN2011/082563
§ 371 (c)(1),
(2), (4) Date: Oct. 22, 2013

(87) PCT Pub. No.: WO2012/142832
PCT Pub. Date: Oct. 26, 2012

(65) Prior Publication Data
US 2014/0051479 A1    Feb. 20, 2014

(30) Foreign Application Priority Data
Apr. 22, 2011    (CN) .......................... 2011 1 0102737

(51) Int. Cl.
H02J 1/00    (2006.01)
G06F 13/40    (2006.01)
H02J 7/00    (2006.01)
(52) U.S. Cl.
CPC ........... G06F 13/4068 (2013.01); H02J 7/0052 (2013.01); H02J 2007/0062 (2013.01)
(58) Field of Classification Search
CPC ............ H02J 2007/0062; H02J 7/0052; G06F 13/4068

USPC ........................................................... 307/13
See application file for complete search history.

(56) References Cited

FOREIGN PATENT DOCUMENTS

| CN | 1444150 | 9/2003 |
|----|---------|--------|
| CN | 1574541 | 2/2005 |
| CN | 1749925 | 3/2006 |
| CN | 1749925 A | 3/2006 |
| CN | 101674366 | 3/2010 |
| CN | 101783427 | 7/2010 |
| CN | 102202117 | 9/2011 |

OTHER PUBLICATIONS

International Search Report for International Patent Application No. PCT/CN2011/082563, mailed Feb. 23, 2012.

*Primary Examiner* — Hal Kaplan
(74) *Attorney, Agent, or Firm* — McAndrews, Held & Malloy, Ltd.

(57) ABSTRACT

The disclosure provides an electronic device with a Universal Serial Bus (USB) interface and a method for starting USB communication for a USB interface, so as to solve the problem that a mobile phone terminal device can be damaged easily when a charger shares one interface with USB communication in the conventional art. A control pin of the control circuit of the device is connected with a VCHG pin of a power management chip; an output pin of the control circuit is connected with a USB_VBUS pin of a USB interface chip; a power pin of the control circuit is connected with a fixed voltage input end which inputs a high level; and the control circuit is configured to output a fixed voltage from the output pin of the control circuit when detecting that the voltage of the control pin is more than a set threshold and output a low level from the output pin of the control circuit when detecting that the voltage of the control pin is less than the set threshold. The charging voltage (VCHG) of the handheld terminal product is only used as the control signal which is isolated from the voltage output to the USB_VBUS pin, so that the damage to the device is avoided.

12 Claims, 2 Drawing Sheets

ELECTRONIC DEVICE WITH USB INTERFACE AND METHOD FOR STARTING USB COMMUNICATION THEREFOR

TECHNICAL FIELD

The disclosure relates to the technical field of Universal Serial Buses (USB), in particular to an electronic device with a USB interface and a method for starting USB communication for an electronic device with a USB interface.

BACKGROUND

An electronic device with a USB interface in the conventional art, such as a handheld terminal with a USB interface, adopts one cable to implement both USB communication and charging, namely, the cable can be used for both charging and USB communication. Thereby, the Charge Voltage (VCHG) at the anode of the charging interface of a mobile phone and the USB_VBUS are directly or indirectly short circuited.

The USB interface circuit of a handheld terminal device is provided with two pins, wherein one pin is a Charge Voltage (VCHG) of a power management chip and is configured to detect the plugging/unplugging status of a charger, when the voltage of a VCHG terminal is more than a threshold (such as 3.3V), it is determined that the charger is plugged, and when the voltage of the VCHG terminal is less than or equal to a threshold (such as 3.3V), it is determined that the charger is unplugged; and the other pin is the power anode of the USB (USB_VBUS) of a USB interface chip, when the voltage of the USB_VBUS terminal is more than the Session value (such as 2.0V) in the USB specification, it is determined that the USB communication cable is plugged to start a USB status machine, and when the voltage of the USB_VBUS terminal is less than or equal to the Session value (such as 2.0V) in the USB specification, it is determined that the USB communication cable is unplugged.

The starting condition of the charging status machine of the handheld terminal with the USB interface is detecting whether the voltage of the anode of the charging interface is more than a certain threshold (such as 3.3V), when the applied voltage is more than the threshold, it is determined that the charger is plugged and the charging management is started; otherwise, the charger is unplugged and the charging is stopped. Meanwhile, the working voltage of the VCHG is in a high range, generally from more than ten volts to twenty volts (such as 18V); and the working voltage of the USB_VBUS terminal is in a low range, generally 5.25V.

All in all, the starting condition of the USB status machine of the handheld terminal is: detecting whether the voltage of the USB_VBUS terminal (the power anode of the USB) is more than the Session value (such as 2.0V) in the USB specification; and if the applied voltage is more than the Session value, the USB enumeration process is started, otherwise, the USB status machine is stopped. The maximum working voltage of the USB_VBUS is generally 5.25V, which is relatively low. Based on this, the starting conditions of a USB status machine and a charging status machine are different, and a circuit is required to distinguish different signals to start USB communication. The present solution for starting USB when a charger shares one interface with USB communication in the industry is generally as shown in FIG. 1: the VCHG is subjected to voltage reduction by a Zener diode D1 and then connected to the USB_VBUS. The method is simple in circuit but has the following defect the Zener diode is slow in response, so that protection cannot be provided for the overshoot caused by the instant plugging of the charger.

Thus, a mobile phone terminal device can be damaged easily when a charger shares one interface with USB communication in the conventional art.

SUMMARY

In view of the above, the disclosure provides an electronic device with a USB interface and a method for starting USB communication for an electronic device with a USB interface, so as to solve the problem that a mobile phone terminal device can be damaged easily when a charger shares one interface with USB communication in the conventional art. The electronic device with a USB interface includes a power management chip, a USB interface chip and a control circuit, wherein the control circuit is connected with the power management chip and the USB interface chip respectively and adopts a charging voltage (VCHG) input to the power management chip as a control signal to output a voltage corresponding to the control signal to a USB power anode (USB_VBUS) pin of the USB interface chip, wherein the control signal and the voltage output to the USB_VBUS pin are mutually isolated.

In the electronic device with a USB interface, a control pin of the control circuit is connected with a charging voltage (VCHG) pin of the power management chip; an output pin of the control circuit is connected with the USB_VBUS pin of the USB interface chip; a power pin of the control circuit is connected with a fixed voltage input end; the fixed voltage input end inputs a high level which is more than a starting voltage of a USB status machine and less than a maximum working voltage of the USB_VBUS; the control circuit is configured to output a fixed, voltage from the output pin of the control circuit when detecting that the voltage at the control pin is more than a set threshold, and is configured to output a low level from the output pin of the control circuit when detecting that the voltage at the control pin is less than the set threshold, wherein the low level is more than or equal to 0V and less than the starting voltage of the USB status machine.

In the electronic device with a USB interface, the control circuit further includes a first triode and a second triode, wherein the base of the first triode is connected with a charging voltage (VCHG) pin of the power management chip, the collector of the first triode is connected with the base of the second triode, and the emitter of the first triode is grounded; and the emitter of the second triode is connected with a fixed voltage output end, and the collector of the second triode is connected with the USB_VBUS pin of the USB interface chip and is grounded through a third resistor.

In the electronic device with a USB interface, the base of the first triode is connected with the charging voltage (VCHG) pin of the power management chip through a first resistor.

In the electronic device with a USB interface, the collector of the first triode is connected with the base of the second triode through a second resistor.

In the electronic device with a USB interface, the first triode is a Negative-Positive-Negative (NPN) triode and the second triode is a Positive-Negative-Positive (PNP) triode.

In the electronic device with a USB interface, the control circuit further includes a first triode and a first Metal-Oxide-Semiconductor Field Effect Transistor (MOSFET), wherein the base of the first triode is connected with a charging voltage (VCHG) pin of the power management chip, the collector of the first triode is connected with the gate of the first MOSFET, and the emitter of the first triode is grounded; and the drain of the first MOSFET is connected with a fixed voltage output end, the source of the first MOSFET is connected with the USB_VBUS pin of the USB interface chip and is grounded through a third resistor, and the drain of the first MOSFET is connected with the gate of the first MOSFET through a fifth resistor.

In the electronic device with a USB interlace, the base of the first triode is connected with the charging voltage (VCHG) pin of the power management chip through a first resistor.

In the electronic device with a USB interface, the collector of the first triode is connected with the gate of the first MOSFET through a fourth resistor.

In the electronic device with a USB interface, the first triode is an NPN triode and the MOSFET is a P-type MOSFET.

An embodiment of the disclosure also provides a method for starting USB communication for an electronic device with a USB interface, including:

detecting, by a control circuit, a charging voltage (VCHG) signal; and outputting, by the control circuit, a voltage corresponding to a control signal to a USB power anode (USB_VBUS) pin according to the VCHG signal, wherein the control signal and the voltage output to the USB_BUS pin are mutually isolated.

In the above method, detecting, by the control circuit, the VCHG signal includes: detecting, by the control circuit, the voltage of a control pin; and outputting, by the control circuit, the voltage corresponding to the control signal to the USB_VBUS pin according to the VCHG signal includes: outputting a fixed voltage from an output pin when the control circuit detects that the voltage of the control pin is more than a set threshold, and starting, by a USB interface chip, USB communication according to the fixed voltage input from the USB_VBUS pin; and outputting a low level from the output pin when the control circuit detects that the voltage of the control pin is less than the set threshold, wherein the low level is more than 0V and less than a starting voltage of a USB status machine, and stopping, by the USB interface chip, USB communication according to the low level input from the USB_VBUS pin.

The charging voltage (VCHG) of the handheld terminal product is only used as the control signal (which is isolated from the voltage output by the USB_VBUS pin), so that the control circuit selects to output a high level or a low level which is a fixed voltage to take it as a trigger signal for starting or stopping USB communication, thereby avoiding the damage to the device. Meanwhile, both the charging status machine and the USB status machine can be triggered by the voltage threshold of the VCHG pin.

DETAILED DESCRIPTION OF THE EMBODIMENTS

The basic principle of the disclosure includes: a control pin of a control circuit of a device is connected with a VCHG pin of a power management chip; an output pin of the control circuit is connected with a USB_VBUS pin of a USB interface chip; a power pin of the control circuit is connected with a fixed voltage input end which inputs a high level; and the control circuit is configured to output a fixed voltage from its output pin when detecting that the voltage of the control pin is more than a set threshold and output a low level from its output pin when detecting that the voltage of the control pin is less than the set threshold.

Figure 1:
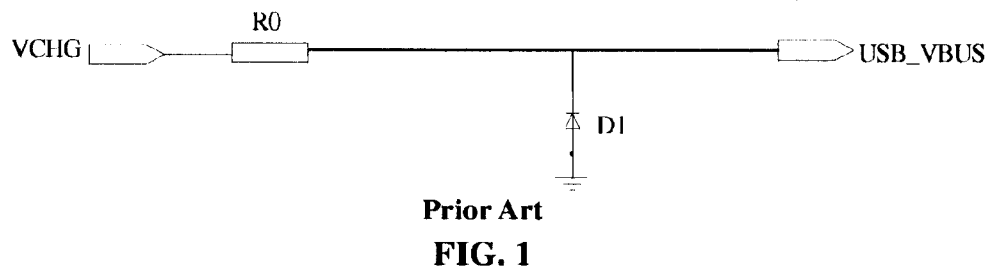
FIG. 1 is a diagram showing the structure of an electronic device with a USB interface in the conventional art.
Figure 2:
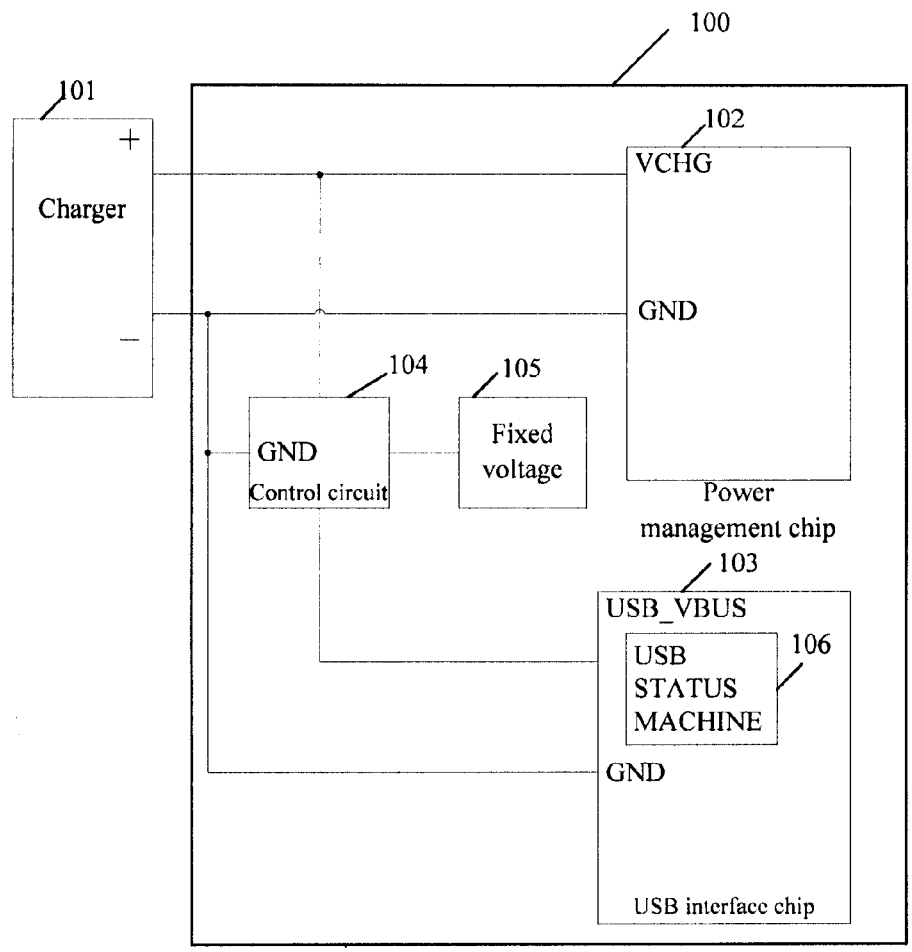
FIG. 2 is a diagram showing the structure of an electronic device with a USB interface provided by an embodiment of the disclosure.

Preferred embodiments of the disclosure are described below with reference to the drawings. The first embodiment of the disclosure shows an electronic device 100 with a USB interface, which is described below fundamentally with reference to FIG. 2. The device 100 includes a power management chip 102, a USB interface chip 103 and a control circuit 104, wherein the control circuit 104 is connected with the power management chip 102 and the USB interface chip 103 respectively and adopts a charging voltage (VCHG) input to the power management chip 102 as a control signal to output a voltage corresponding to the control signal to a USB power anode (USB_VBUS) pin of the USB interface chip 103, wherein the control, signal and the voltage output to the USB_VBUS pin are isolated mutually. Specifically, the power management chip 102, the USB interface chip 103 and the control circuit 104 are grounded commonly. A charging voltage (VCHG) pin and a grounded pin of the power management chip 102 are connected with the anode and cathode of an external charger 101 respectively; the control pin of the control circuit 104 is connected with the VCHG pin of the power management chip 102; the output pin of the control circuit 104 is connected with the USB power anode (USB_VBUS) pin of the USB interface chip 102; the power pin of the control circuit 104 is connected with a fixed voltage input end 105; the fixed voltage input end 105 inputs a high level, such as 2.85V, which is more than a starting voltage of a USB status machine 106, such as 2.0V and less than the maximum working voltage of the USB_VBUS, such as 5.25V; and the control circuit 104 is configured to output a fixed voltage from its output pin when detecting that the voltage of the control pin is more than a set threshold, such as 3.3V, and output a low level of 0V from its output pin when detecting that the voltage of the control pin is less than the set threshold, 3.3V, wherein the low level should be more than or equal to 0V and less than the starting voltage of the USB status machine 106.

Based on the circuit, the principle of the method for starting the USB by the VCHG is as follows.

1: A control circuit detects the voltage of a control pin.

2: The control circuit outputs a fixed high level (ranging from 2.0V to 5.0V, such as 2.85V) from an output pin when detecting that the voltage at the VCHG is more than a threshold and the fixed high level is connected to the USB_VBUS pin. The USB interface chip starts the USB status machine when the USB_BUS detects the voltage at the USB_VBUS is more than the Session value (such as 2.0V) in the USB specification.

3: The control circuit outputs a fixed low level (ranging from 0V to 2.0V, such as 0V) from the output pin when detecting that the voltage at the VCHG is less than or equal to a threshold, and the fixed low level is connected to the USB_VBUS pin. The USB interface chip stops the USB status machine when the USB_VBUS detects the voltage at the USB_VBUS is less than the Session value (such as 2.0V) in the USB specification.

Figure 3:
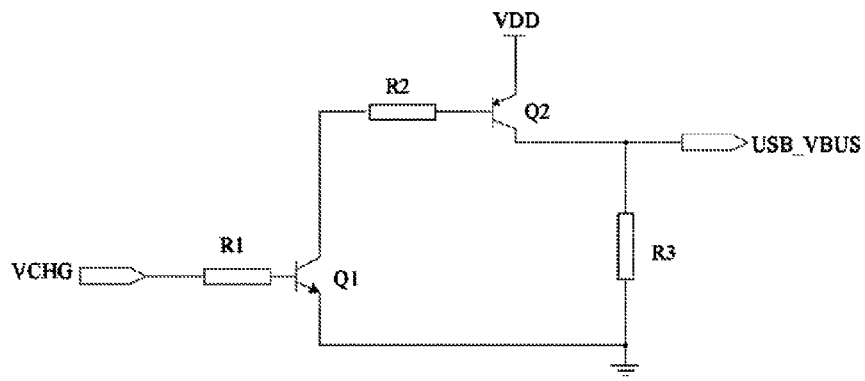
FIG. 3 is a diagram showing the structure of an electronic device including double triodes provided by an embodiment of the disclosure.

With reference to FIG. 3, the control circuit including an NPN triode and a PNP triode is described below in detail. The control circuit includes:

a first triode Q1, wherein the base of the first triode Q1 is connected with the charging voltage (VCHG) pin of the power management chip through a first resistor R1, the collector of the first triode Q1 is connected with the base of a second triode Q2 through a second resistor R2 and the emitter of the first triode Q1 is grounded; and the second triode Q2, wherein the emitter of the second triode Q2 is connected with a fixed voltage output end and the collector of the second triode Q2 is connected with the USB_VBUS pin of the USB interface chip and is grounded through a third resistor R3.

The role of each component of the control circuit is described as follows. The first resistor R1 and the NPN triode (the first triode Q1) form a charging input voltage detection part, wherein the first resistor R1 is configured to adjust a detection voltage threshold and a maximum input voltage value, namely, adjusting the turn-on voltage threshold of the first triode Q1 and the charging threshold to be almost the same and meet the requirement of overvoltage protection, for example, if the maximum voltage for the overvoltage protection is 10V, the control circuit and other circuits of the terminal may not be damaged when the VCHG is 0-10V. The second resistor R2 and the PNP triode (the second triode Q2) form a control output part, wherein the second resistor R2 is configured to limit current and the second triode Q2 is configured to control output. The fixed voltage input end 105 is a high-level fixed voltage source VDD, ranging from 2.0V to 5.0V. The third resistor R3 serves as a pull-down resistor to ensure that the output of the second triode Q2 is 0V when the second triode Q2 is off.

Correspondingly, in an embodiment of the disclosure provides a method for starting USB communication by VCHG, a control circuit detects a VCHG signal and outputs a voltage corresponding to a control signal to a USB_VBUS pin according, to the VCHG signal, specifically including steps as follows.

Step 1: It is detected whether the charging voltage (VCHG) is more than a threshold (such as 3.3V), if so, Step 2 is executed, otherwise, Step 3 is executed.

Step 2: The first triode Q1 is on and then the second triode Q2 is on. A fixed high level VDD (such as 2.85V) is added to the USB_VBUS, and if the voltage is more than the Session value, starting the USB communication and returning to Step 1.

Step 3: The first triode Q1 is off and controls the second triode Q2 to be off, thereby, the voltage 0V generated by the pull-down effect of the third resistor R3 to the ground is added to the USB_VBUS, and if the voltage is less than the Session value, stopping the USB communication and returning to Step 1.

Figure 4:
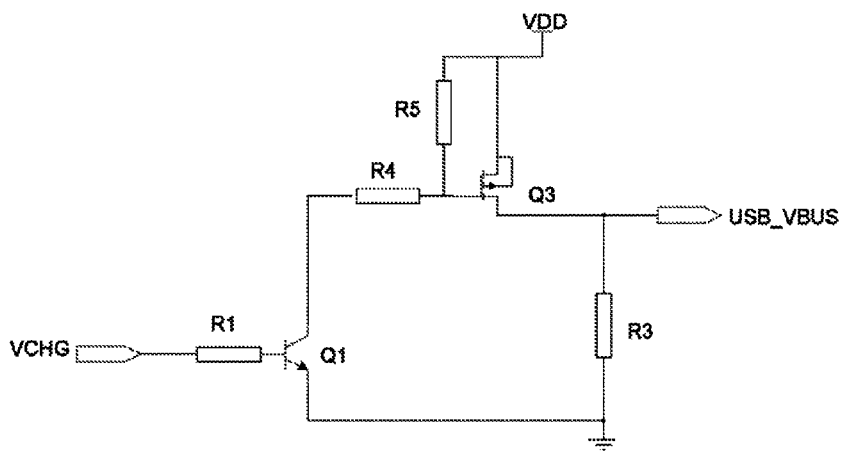
FIG. 4 is a diagram showing the structure of an electronic device including a triode and an MOSFET provided by an embodiment of the disclosure.

With reference to FIG. 4, the control circuit including an NPN triode and an MOS tube, i.e., an MOSFET, is described in detail. The control circuit includes:

a first triode Q1, wherein the base of the first triode Q1 is connected with the charging voltage (VCHG) pin of a power management chip through a first resistor R1, the collector of the first triode Q1 is connected with the gate of the first MOS tube Q3 through a fourth resistor R4 and the emitter of the first triode Q1 is grounded; and the first MOS tube Q3, wherein the drain of the first MOS tube Q3 is connected with a fixed voltage output end, the source of the first MOS tube Q3 is connected with the USB_VBUS pin of the USB interface chip and is grounded through a third resistor R3, and the drain of the first MOS tube Q3 is connected with the gate of the first MOS tube Q3 through a fifth resistor R5.

The role of each component of the circuit is described as follows. The first resistor R1 and the NPN triode (the first triode Q1) form a charging input voltage detection part, wherein the first resistor R1 is configured to adjust a detection voltage threshold and a maximum input voltage value, namely, adjusting the turn-on voltage threshold and the charging threshold of the first triode Q1 to be almost the same and meet the requirement of overvoltage protection, for example, if the maximum voltage for the overvoltage protection is 10V, the control circuit and other circuits of the terminal may not be damaged when the VCHG is 0-10V. The fifth resistor R5, the fourth resistor R4 and the MOS tube Q3 form a control output part, wherein the fourth resistor R4 is configured to limit current and the MOS tube Q3 is con figured to control output. The fifth resistor R5 serves as a pull-up resistor to ensure that the MOS tube Q3 is also off when the first triode Q1 is off. The fixed voltage input end 105 is a high-level fixed voltage source VDD, ranging from 2.0V to 5.0V. The third resistor R3 serves as a pull-down resistor to ensure that the output of the MOS tube Q3 is 0V when the MOS tube Q3 is off. A P-type MOS tube is adopted in the embodiment.

Correspondingly, the method for starting USB communication by the VCHG provided by the embodiment of the disclosure includes the following steps.

Step 4: It is detected whether the charging voltage (VCHG) is more than a threshold (such as 3.3V), if so, Step 5 is executed, otherwise, Step 6 is executed.

Step 5: The first triode Q1 is on and then the MOS tube Q3 is on. A fixed high level VDD (such as 2.85V) is added to the USB_VBUS, and if the voltage is more than the Session value, starting the USB communication and returning to Step 4.

Step 6: The first triode Q1 is off and controls the MOS tube Q3 to be off, thereby, the voltage 0V generated by the pull-down effect of the third resistor R3 to the ground is added to the USB_VBUS, and if the voltage is less than the Session value, stopping the USB communication and returning to Step 4.

Finally, it should be explained that the embodiments above are only intended to describe the technical solution of the disclosure instead of limiting the disclosure. Although the disclosure is described in detail with reference to the preferred embodiments, those skilled in the art shall understand that any modifications or equivalent replacements can still be made for the technical solution of the disclosure, and the modified technical solution is still within the scope of the technical solution of the disclosure even subjected to these modifications or equivalent replacements.

What is claimed is:

1. An electronic device with a universal serial bus (USB) interface, comprising a power management chip, a USB interface chip and a control circuit, wherein the control circuit is connected with the power management chip and the USB interface chip respectively and adopts a charging voltage (VCHG) input to the power management chip as a control signal to output a voltage corresponding to the control signal to a USB power anode (USB_VBUS) pin of the USB interface chip, wherein the control signal and the voltage output to the USB_VBUS pin are mutually isolated.

2. The electronic device with the USB interlace according to claim 1, wherein a control pin of the control circuit is connected with a chanting voltage (VCHG) pin of the power management chip; an output pin of the control circuit is connected with the USB_VBUS pin of the USB interface chip; a power pin of the control circuit is connected with a fixed voltage input end; the fixed voltage input end inputs a high level which is more than a starting voltage of a USB status machine and less than a maximum working voltage of the USB_VBUS; the control circuit is configured to output a fixed voltage from the output pin of the control circuit when detecting that the voltage at the control pin is more than a set threshold, and is configured to output a low level from the output pin of the control circuit when detecting that the voltage at the control pin is less than the set threshold, wherein the low level is more than or equal to 0V and less than the starting voltage of the USB status machine.

3. The electronic device with the USB interface according to claim 1, wherein the control circuit further comprises a first triode and a second triode, wherein
the base of the first triode is connected with a charging voltage (VCHG) pin of the power management chip, the collector of the first triode is connected with the base of the second triode, and the emitter of the first triode is grounded; and
the emitter of the second triode is connected with a fixed voltage output end, and the collector of the second triode is connected with the USB_VBUS pin of the USB interface chip and is grounded through a third resistor.

4. The electronic device with the USB interface according to claim 3, wherein the base of the first triode is connected with the charging voltage (VCHG) pin of the power management chip through a first resistor.

5. The electronic device with the USB interface according to claim 3, wherein the collector of the first triode is connected with the base of the second triode through a second resistor.

6. The electronic device with USB interface according to claim 3, wherein the first triode is a Negative-Positive-Negative (NPN) triode and the second triode is a Positive-Negative-Positive (PNP) triode.

7. The electronic device with the USB interface according to claim 1, wherein the control circuit further comprises a first triode and a first Metal-Oxide-Semiconductor Field Effect Transistor (MOSFET), wherein
the base of the first triode is connected with a charging voltage (VCHG) pin of the power management chip, the collector of the first triode is connected with the gate of the first MOSFET, and the emitter of the first triode is grounded; and the drain of the first MOSFET is connected with a fixed voltage output end, the source of the first MOSFET is connected with the USB_VBUS pin of the USB interface chip and is grounded through a third resistor, and the drain of the first MOSFET is connected with the gate of the first MOSFET through a fifth resistor.

8. The electronic device with the USB interface according to claim 7, wherein the base of the first triode is connected with the charging voltage (VCHG) pin of the power management chip through a first resistor.

9. The electronic device with the USB interface according to claim 7, wherein the collector of the first triode is connected with the gate of the first MOSFET through a fourth resistor.

10. The electronic device with the USB interface according to claim 7, wherein the first triode is an NPN triode and the MOSFET is a P-type MOSFET.

11. A method for starting USB communication for an electronic device with USB interface, comprising:
detecting, by a control circuit, a charging voltage (VCHG) signal; and
outputting, by the control circuit, a voltage corresponding to a control signal to a USB power anode (USB_VBUS) pin according to the VCHG signal, wherein the control signal and the voltage output to the USB_VBUS pin are mutually isolated.

12. The method according to claim 11, wherein detecting, by the control circuit, the VCHG signal comprises: detecting, by the control circuit, the voltage of a control pin; and
outputting, by the control circuit, the voltage corresponding to the control signal to the USB_BUS pin according to the VCHG signal comprises: outputting a fixed voltage from an output pin when the control circuit detects that the voltage of the control pin is more than a set threshold, and starting, by a USB interface chip, USB communication according to the fixed voltage input from the USB_VBUS pin; and
outputting a low level from the output pin when the control circuit detects that the voltage of the control pin is less than the set threshold, wherein the low level is more than 0V and less than a starting voltage of a USB status machine, and stopping, by the USB interface chip, USB communication according to the low level input from the USB_VBUS pin.

* * * * *